(No Model.) 2 Sheets—Sheet 1.

W. F. ALTENBAUGH.
METHOD OF COOLING GLASS ARTICLES.

No. 599,887. Patented Mar. 1, 1898.

WITNESSES:
Geo. M. Copenhaver
Finis D. Morris

INVENTOR
William Francis Altenbaugh
BY
Johnson and Johnson
ATTORNEYS.

THE NORRIS PETERS CO., PHOTO-LITHO., WASHINGTON, D. C.

(No Model.) 2 Sheets—Sheet 2.
W. F. ALTENBAUGH.
METHOD OF COOLING GLASS ARTICLES.
No. 599,887. Patented Mar. 1, 1898.
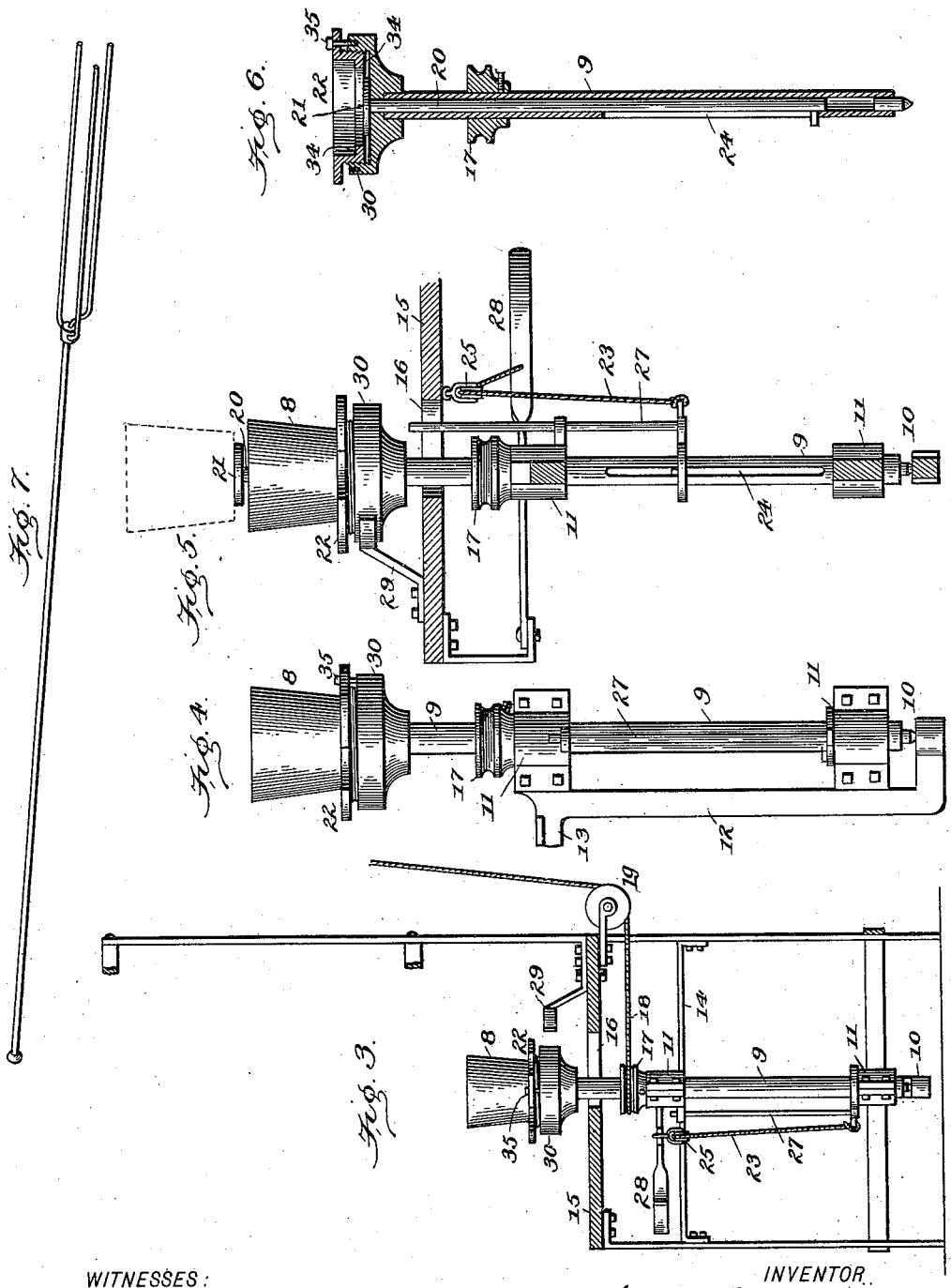
WITNESSES:
Geo. M. Copenhaver,
Finis D. Morris
INVENTOR
William Francis Altenbaugh
BY Johnson and Johnson
ATTORNEYS.

UNITED STATES PATENT OFFICE.

WILLIAM FRANCIS ALTENBAUGH, OF TIFFIN, OHIO, ASSIGNOR TO THE UNITED STATES GLASS COMPANY, OF PITTSBURG, PENNSYLVANIA.

METHOD OF COOLING GLASS ARTICLES.

SPECIFICATION forming part of Letters Patent No. 599,887, dated March 1, 1898.

Application filed September 18, 1897. Serial No. 652,123. (No model.)

*To all whom it may concern:*

Be it known that I, WILLIAM FRANCIS ALTENBAUGH, of Tiffin, in the county of Seneca and State of Ohio, have invented a new and useful Improvement in Methods of Cooling Glass Articles, of which the following is a full, clear, and exact description, reference being had to the accompanying drawings, forming part of this specification, in which—

Figure 1:
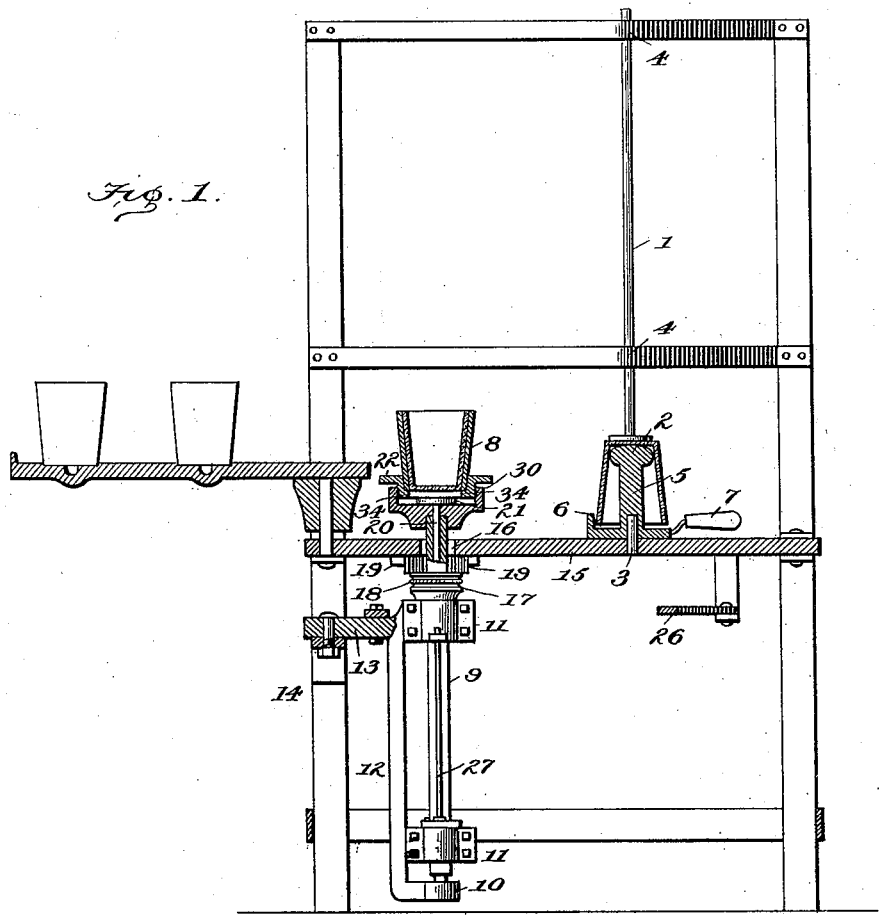
Figure 2:
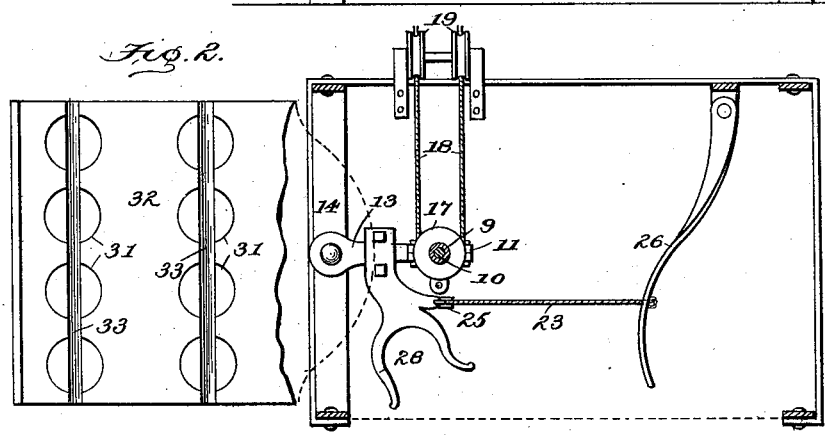

Figure 1 is a vertical section of my improved machine, a reheated tumbler being shown in position upon the plug, another tumbler having been transferred from the plug to the cup. Fig. 2 is a horizontal section taken beneath the table, showing the provisions for swinging the cup-supporting shaft to control its rotation and for lifting the tumbler from the cup. Fig. 3 is a vertical transverse section of the machine. Figs. 4 and 5 are enlarged side views of the swing-frame and of its cup-supporting shaft in different positions. Fig. 6 is a vertical section of the cup-supporting shaft, and Fig. 7 shows the tongs for handling the tumblers.

The purpose of my invention is to devise a method for the final cooling of glass articles, such as tumblers, &c. I have discovered that a perfect finish may be given to such articles if after taking them from the molds in which they are pressed they are reheated and then set in an upright rotatory cup or receiver which is of the final shape of the article and is substantially the shape and size which the glass has when it is taken from the mold and is of proper length to extend to the end of the article. When the article is set in this cup or receiver, the latter is rotated rapidly—say at the rate of about five hundred revolutions per minute. The glass article rotates with the cup and at the same rate of speed, and the centrifugal action induced by the rotation sustains the plastic glass against the side of the cup while it is setting and prevents it from collapsing or falling inwardly until it has become sufficiently cold to be rigid and in no danger of further distortion. Entire uniformity of the glass article is thus obtained. If the glass article is in any respect out of shape when it is put into the cup or receiver, the centrifugal action to which it is subjected will correct such defect, although the operation of my improvement is not the molding of the glassware in order to substantially modify its form, but the sustaining or holding of the same while cooling and the preservation of the shape given to it in the mold. As already stated, the cup or receiver rotates with the glass article. There is no relative movement between its surface and the surface of the glass. The glass therefore is not marred or defaced by scratching and the perfect polish imparted by the fire-finishing is maintained.

In working with the machine the tumbler is taken from the mold by a punty 1 and carried to the reheating-furnace, heated, and placed upon the plug 2, which is first placed upon the table and centered by a table-pin 3 in vertical alinement with guides 4 in a vertical frame, within which guides the staff of the punty is placed to guide the tumbler vertically upon the plug, in which position the tumbler is knocked off the punty. The plug has a stem 5 with an enlarged end, on which the tumbler rests in an inverted position, and the base of the plug is provided with a semicircular curb or flange 6, within which the open end of the tumbler fits and whereby it is held central upon the plug and is allowed to be readily transferred from it. By means of a handle 7 the plug is removed and the tumbler thereon transferred into the cup by turning it off the plug with its open end up. The plug is returned to its position to receive another tumbler from the punty to be transferred in the same way. The cup 8 is preferably made of metal with smooth interior walls and is seated centrally upon a shaft 9, to which may be given a high speed of rotation, such as stated above.

The cup-supporting shaft is mounted, by a suitable step 10 and bearings 11, in a vertical hanger 12, hung by a horizontal arm 13, pivotally connected to the frame 14, preferably at one end thereof and beneath the table 15, so that the hanger is free to swing laterally within certain limits with its shaft, there being an opening 16 in the table through which the shaft passes to carry the cup above it. Above the hanger and preferably below the table the shaft has a pulley 17, from which a belt 18 leads to a power-driven pulley for rotating the cup. The belt from the shaft-pulley passes under idle-pulleys 19, and the belt is made taut or slack to control the rotation of the cup by means which I will presently describe.

The cup-supporting shaft is hollow, and within it is fitted a rod 20, having a disk 21, the normal position of which is just below the cup-seat 22, so that when the rod 20 is lifted the disk 21 will lift the tumbler out of and above the cup, as shown in Fig. 5. This lifting of the tumbler is effected by the cord 23, attached to the lower end of the lifting-rod, there being a vertical slot 24 in the shaft for such attachment, said cord passing over a pulley 25 at the top of the hanger and connecting a lifting-arm 26, pivotally connected to the table. This lifting device maintains its normal position by gravity, and its cord connection may have a guide-rod 27 to prevent the lifter from binding in its movement in the tubular shaft. At its upper end the shaft-hanger has a horizontal stirrup or forked arm 28, situated at or near its swing side, by which the hanger is swung toward and from the front of the machine to tighten and slack the shaft-pulley-propelling belt to control the rotation of the cup. The normal position of the hanger is maintained at the limit of its backward movement by a brake 29 under the pulling action of the shaft-propelling belt, and in this position the pulley-belt is slack, so that the cup does not rotate. To render the belt taut for rotating the cup, the shaft-supporting hanger is pulled toward the front and away from the brake by the knee of the operator. To lift the tumbler from the cup, the lifting cord-connected arm 26 is moved away from the hanger to the knee of the operator.

In working with the machine the operator sits facing the cup, with his left knee in the hanger-stirrup and his right knee against the pivoted arm which connects the tumbler-lifter. The tumbler having been knocked off the punty on the plug the tumbler is transferred thereby into the cup. The finisher then by moving his left knee to the left pulls the hanger toward the front, thereby tightening the pulley-belt and rapidly rotating the cup, which is fixed upon the shaft. By such rapid rotation the glass is expanded and caused to set in final shape, as explained above. In this operation the tumbler cools sufficiently to allow it to be removed, which is done by the operator changing the pressure of his left knee in the stirrup from a front-ward direction to a rearward direction, thereby forcing a hub 30 on the cup-carrying shaft against a suitable brake 29, fixed upon the table, thereby quickly stopping the rotation of the cup. Then, moving his right knee to the right against the pivoted arm 26, he forces it outward, thereby pulling the cord 23 and raising its connected tumbler-lifter, carrying the tumbler above the cup and holding it in that position. The finisher then applying a suitable fork (shown in Fig. 7) to the bottom of the tumbler removes it from the lifting-disk 21 and places it in a seat 31 on a shelf 32, fixed to and projecting from the end of the table. This shelf is provided with one or more rows of seats, within which the tumblers are collected from the cup, and intersecting these rows of seats there is a surface groove 33, which is for receiving one of the fork-tines in applying it beneath the tumblers to remove them to the tempering-oven.

As seen in Figs. 1 and 6, the seat for the cup is a ring circumferentially screw-threaded and engages the interior threaded hub fixed on the end of the shaft, whereby the cup-seat may be adjusted vertically to raise or to lower it within the annular space at the top face of the hub to allow for slight variations in the size of the tumblers. In this adjustment the tumbler may be passed slightly through the cup and rest upon the lifting-disk, so that each tumbler is thereby exactly formed the size of the cup. As the cup-seat would be liable to turn, I provide for fastening the cup-seat when set by its flange to the shaft-hub by means of a pin 35, which passes through the seat-flange into one of a series of holes in the rim of the hub, as seen in Fig. 6.

I do not claim the apparatus above described, since I have made the same the subject of another patent application, Serial No. 630,783, filed by me April 5, 1897.

I claim—

The method of cooling articles of glass from a plastic condition imparted by reheating, which consists in simultaneously maintaining the original shape of the article and rapidly rotating it in a vertical position until cool, substantially as described.

In testimony whereof I have hereunto set my hand.

WILLIAM FRANCIS ALTENBAUGH.

Witnesses:
  JOS. ANDERSON,
  C. F. LANGGUTH.